United States Patent
Asada

[19]

[11] Patent Number: 6,081,642
[45] Date of Patent: Jun. 27, 2000

[54] OPTICAL CONNECTOR

[75] Inventor: Kazuhiro Asada, Yokkaichi, Japan

[73] Assignee: Sumitomo Wiring Systems, Ltd., Yokkaichi, Japan

[21] Appl. No.: 09/025,837

[22] Filed: Feb. 19, 1998

[30] Foreign Application Priority Data

Feb. 20, 1997 [JP] Japan .................................. 9-036046

[51] Int. Cl.⁷ .................................................. G02B 6/36
[52] U.S. Cl. .................................. 385/59; 385/87; 385/83
[58] Field of Search ............................... 385/59, 69, 86, 385/87, 83

[56] References Cited

U.S. PATENT DOCUMENTS

| | | | |
|---|---|---|---|
| 4,279,468 | 7/1981 | Turley et al. | 350/96.21 |
| 4,773,726 | 9/1988 | Ito | 350/96.2 |
| 4,986,625 | 1/1991 | Yamada et al. | 350/96.2 |
| 5,157,749 | 10/1992 | Briggs et al. | 385/60 |
| 5,712,938 | 1/1998 | Lin et al. | 385/59 |
| 5,761,358 | 6/1998 | Kuchenbecker et al. | 385/56 |

FOREIGN PATENT DOCUMENTS

| | | |
|---|---|---|
| 58-42811 | 3/1983 | Japan . |
| 2029010 | 2/1990 | Japan . |
| 5-59412 | 8/1993 | Japan . |

*Primary Examiner*—Hung N. Ngo
*Attorney, Agent, or Firm*—Greenblum & Bernstein, P.L.C.

[57] ABSTRACT

An optical connector secures an optical cable having a fiber optic core and a coating. The optical connector includes the front side of which is provided with ferrules and the rear side of which is provided with openings for inserting optical cables. Cable guides support the cables. A cover of the housing includes pairs of guide plates which flank the cables when the cover is attached to the housing. Each guide plate includes an elongated stopper on the face where the cable is flanked. The stopper has a rectangular cross-section and a sharp edge at its open end. When the cover is placed on the housing, the sharp edge cuts through part of the coating and immobilizes the cable against axial movement.

20 Claims, 7 Drawing Sheets

OPTICAL CONNECTOR

BACKGROUND OF THE INVENTION

1. Field of the Invention

The present invention relates to an optical connector. More particularly, the invention relates to an optical connector that connects fiber optic cables to each other, or to an optical element.

2. Description of Background Information

A fiber optic cable includes a plurality of optical fibers surrounded by a coating.

Japanese Publication No. SHO 58-42811 discloses an optical connector for holding such an fiber optic cable. The optical connector has a ferrule with protrusions on its inner cylindrical surface proximal to the end which connects to the main frame. Tightening the ferrule fixes the fiber optic cable to the connector. However, this tightening requires the application of considerable force, which compresses the optical cables; this compression results in an optical loss in transmission along the cable. While the application of less force reduces the optical loss, it also reduces the gripping strength of the ferrule.

In an optical connector disclosed in Japanese Publication No. HEI 2-29010, a pair of opposing sidewalls gradually enlarges toward an open end. The internal surfaces ofthese side walls have a plurality of undulating projections. The fiber optic cable is passed between the two sidewalls and held by tightening them. However, this tightening results in the same type of optical loss as discussed above.

Another optical connector, disclosed in Japanese Publication No. HEI 5-59412, has a clamp made of a thin metal sheet to form a channel having an U-shaped cross-section. The channel is pushed onto the fiber optic cable to cut into the cable coating to hold the optical cable. In this case, the width of the U-channel is slightly smaller than the diameter of the cable while the sidewalls of the U-shaped channel gradually enlarge from its closed end toward its open ends. When the optical cable is inserted into the U-shaped channel, the open ends cut into the cable coating, and the U-shaped channel is then thrust onto the coating. However, the clamp is small and made of a thin metal sheet. Consequently, the connector cannot be mounted easily, and may deform during mounting. Furthermore, as the open ends of the U-shaped channel forcibly cut into the cable coating, compression from the gradually decreasing width between the sidewalls of the U-shaped channel unavoidably distorts the optical fibers.

SUMMARY OF THE INVENTION

An object of the present invention is therefore to overcome the above-mentioned problems of the prior art.

A further object of the present invention is to provide an optical connector that is easy to assemble, securely fixes a fiber optic cable, and minimizes optical losses.

According to an embodiment of the present invention, there is provided an optical connector which supports at least one fiber optic cable, the cable having a fiber optic core and a surrounding coating. A housing has a longitudinal direction, along which the at least one cable is arranged, and an elevational direction. A cover is provided. At least one cable guide supports each of the at least one fiber optic cable. The at least one cable guide is provided on one of the housing and the cover, and extends along the longitudinal direction. At least one pair of guide plates is provided on the other of the housing and the cover. The at least one pair of guide plates extends along the longitudinal and elevational directions and forms parallel opposing faces to flank the at least one fiber optic cable when the housing and the cover are connected. At least one stopper is provided on each of the parallel opposing faces of each of the at least one pair of guide plates along the elevational direction. The at least one stopper has an end which forms a cutting edge. When the housing and the cover are being connected, the cutting edge cuts away part of the coating of the at least one fiber optic cable such that the at least one stopper securely holds the at least one fiber optic cable.

According to a feature of the above embodiment, the cutting edge has an angle of 50 to 90° with respect to the coating.

According to another feature of the above embodiment, the at least one stopper on each of the at least one pair of guide plates forms a plurality of pairs of stoppers facing each other at both sides of the at least one fiber optic cable, and each pair is provided along the longitudinal direction at a predetermined pitch.

According to yet another feature of the above embodiment, the cutting edge of the at least one stopper has a length of not more than 1 mm along the longitudinal direction.

According to still yet another feature of the above embodiment, the at least one stopper includes a first stopper having a substantially rectangular cross-section and an innermost face extending along the elevational direction. The face has a groove along the elevational direction.

According to a further feature of the above embodiment, the housing has a front side and a rear side at each end of the longitudinal direction. The front side includes at least one ferrule, and the rear side includes at least one opening respectively, which can receive the at least one fiber optic cable.

According to a yet further feature of the above embodiment, the at least one stopper includes a stopper having a substantially rectangular cross-section and a face facing the front sides. The face tapers towards the front side as it extends from the guide plate.

According to a still yet further feature of the above embodiment, the first stopper has a face facing the front side. The face tapers towards the front side as it extends from the guide plate.

According to yet another feature of the above embodiment, the cable guide comprises a channel along the longitudinal direction.

BRIEF DESCRIPTION OF THE FIGURES

The above and other objects, features and advantages of the present invention will become apparent from the following description of the preferred embodiments, given as non-limiting examples, with reference to the accompanying drawings in which.

DETAILED DESCRIPTION OF THE PREFERRED EMBODIMENTS

Figure 1:
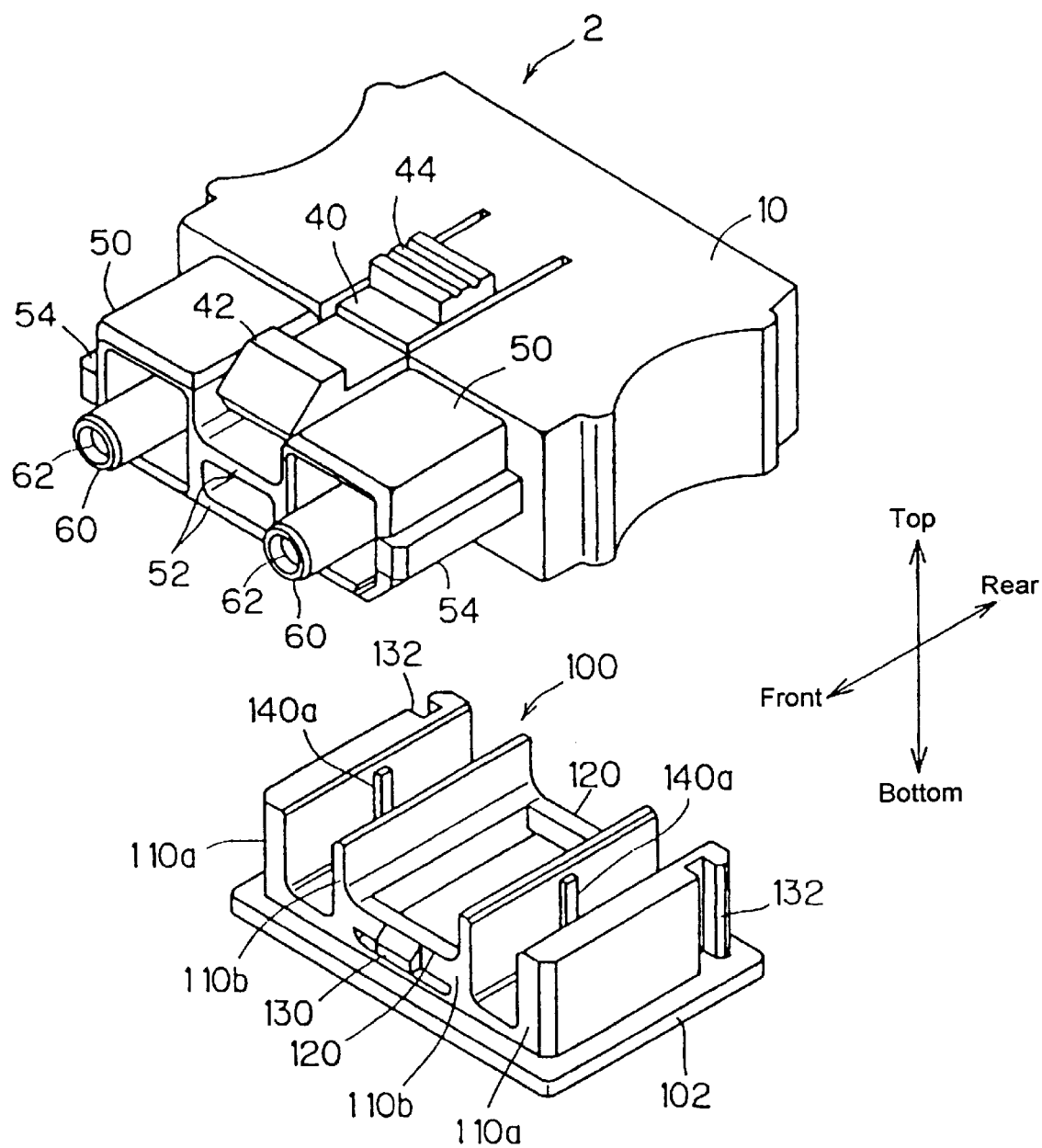
FIG. 1 is a top perspective view of a first embodiment of an optical connector according to the present invention, with a cover removed.

A first embodiment of the present invention is described with reference to FIGS. 1 and 2.

In this embodiment, the optical connector includes a housing 2, defining a housing space therein, and a cover 100. Housing 2 includes a casing portion 10 having an open bottom. The front face of casing portion 10 is provided with a pair of parallel engaging portions 50 that project frontwards with a predetermined distance therebetween. Engaging portions 50 link to each other via a linking element 52 provided therebetween. Each engaging portion 50 is also provided with a guiding rib 54 on its outer face, opposite the connection with linking element 52.

A ferrule 60 is provided inside each engaging portion 50 for receiving and holding a respective fiber optic cable. Each ferrule 60 has a cylindrical shape with a cable path 62 which communicates with the housing space of housing 2.

The outer rims of engaging portions 50 and ferrules 60 are tapered outwards to form beveled surfaces 56 and 66, respectively. This shape allows the connector to easily connect to a corresponding socket of another connector (not shown in the figures).

The upper face of casing portion 10 is cut to form a spring plate 40, which extends from the center part of the upper surface towards the upper part of engaging portions 50. Plate 40 has a first end integral with the upper face of casing portion 10. Respective cutouts in the latter define the sides of plate 40 that are adjacent the upper surface. Plate 40 is thus flexible about its first end, perpendicular to its rest plane. A central portion of plate 40 is provided with a finger grip 44 for applying a flexing force. The second end of the plate 40, which projects beyond the upper surface of casing portion 10 and up to the end of engaging portions 50, is equipped with a locking claw 42.

When engaging portions 50 and ferrules 60 connect to a receiving optical connector, locking claw 42 mates with a corresponding locking recess (not shown in the figures). Pushing finger grip 44 down releases locking claw 42, whereby the inserted optical connector can be withdrawn from the receiving optical connector.

Two openings 12 for inserting the fiber optic cables are provided in the rear wall of the casing portion 10. Openings 12 align with cable paths 62 in the front wall.

A divider 20 separates the housing space into right and a left compartments. Each compartment has a cable guide 14 extending laterally from the opening 12 to the cable path 62.

Each cable guide 14 has a curved channel along the upper surface thereof, which guides the fiber optic cable from the opening 12 into the cable path 62.

The end of the optical cable is initially stripped of the coating. This stripped end part is inserted into the ferrules 60.

The open side of the casing portion 10 (bottom side in FIG. 1 and upper side in FIG. 2) is provided with a horizontal step 18 on its peripheral inner rim. This step contains an inwardly-slanting face 22 in the middle of the front rim and of the rear rim, respectively. Correspondingly, the cover 100 is provided with a locking tabs 130 which mate with locking recesses 24 below face 22.

Guiding ribs 26 are further provided on the inner face of the right and the left sidewalls which define the housing space of the casing portion 10.

The cover 100 includes a plate 102 which closes the space of the housing 2. The plate 102 is provided with a pair of guide plates 110a and 110b at the right and left compartments, respectively, disposed perpendicular to the general plane of the plate 102.

Guide plates 110a have an outermost face equipped with a guiding slot 132. This slot 132 has a shape designed to mate with guiding rib 26. Guide plates 110a and 110b link to each other through bridging element 120 near the front and rear sides. The middle of each bridging element 120 is provided with locking tab 130 which mate with complementary-shaped locking recess 24.

When placing cover 100 onto the open side of housing 2, the guiding ribs 26 are first inserted into the guiding slots 132. Then, locking tabs 130 slide down along slanting face 22 to mate with complementary-shaped locking recesses 24. Covering plate 102 is then positioned on the horizontal step 18, whereby cover 100 is securely fitted to housing 2.

The pair of guide plates 110a and 110b flank the optical cable arranged on cable guides 14. Consequently, the distance between guide plates 110a and 110b is slightly larger than the diameter of the fiber optic cable.

Figure 2:
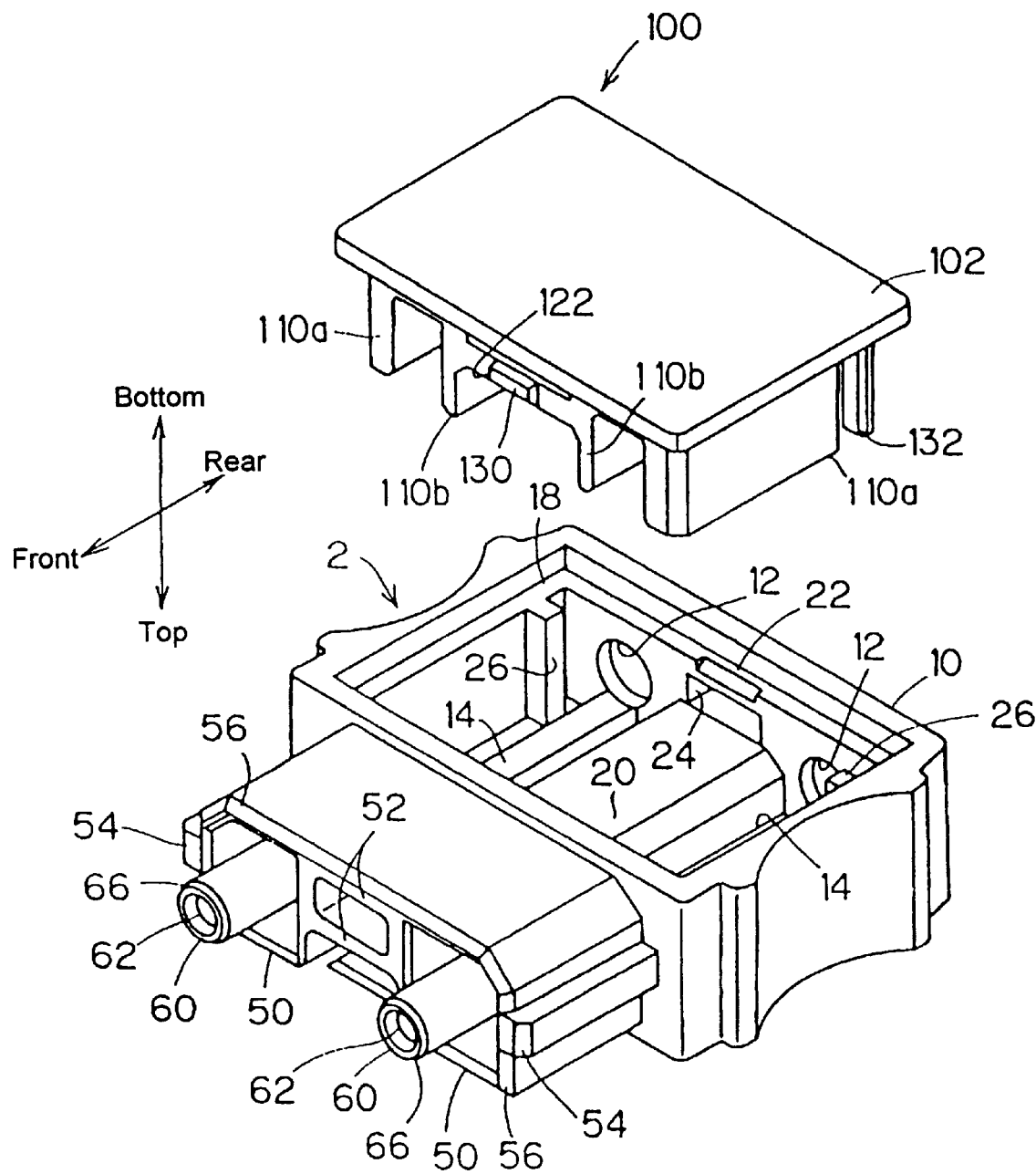
FIG. 2 is a bottom perspective view of the optical connector of FIG. 1.
Figure 3:
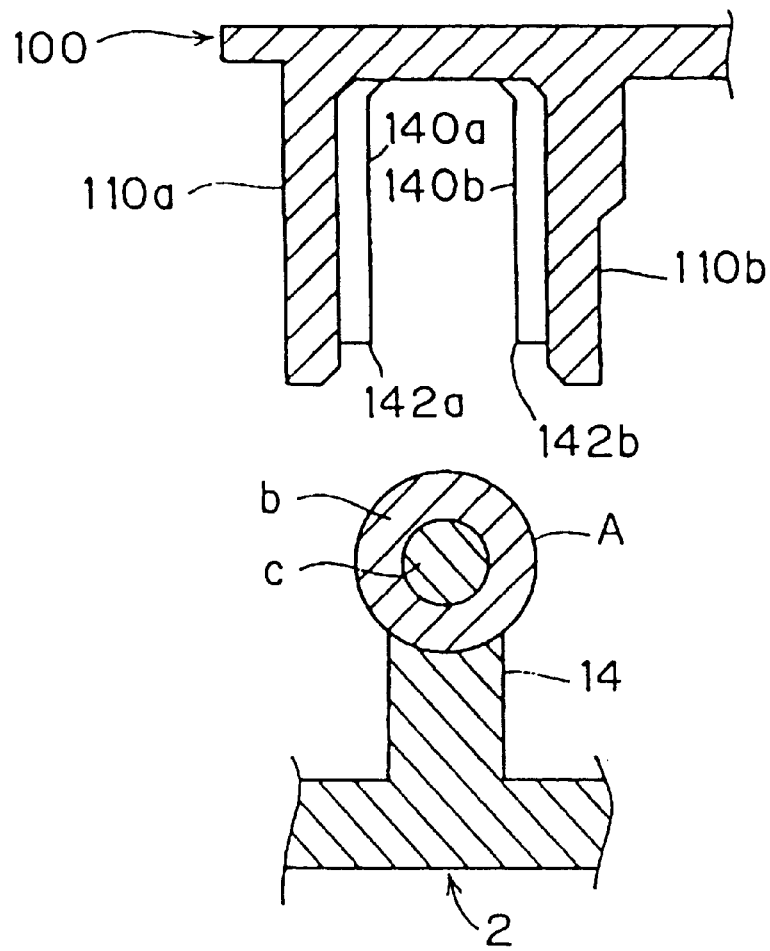
FIG. 3 is a cross-section of the optical connector of FIG. 1 before assembly.
Figure 4:
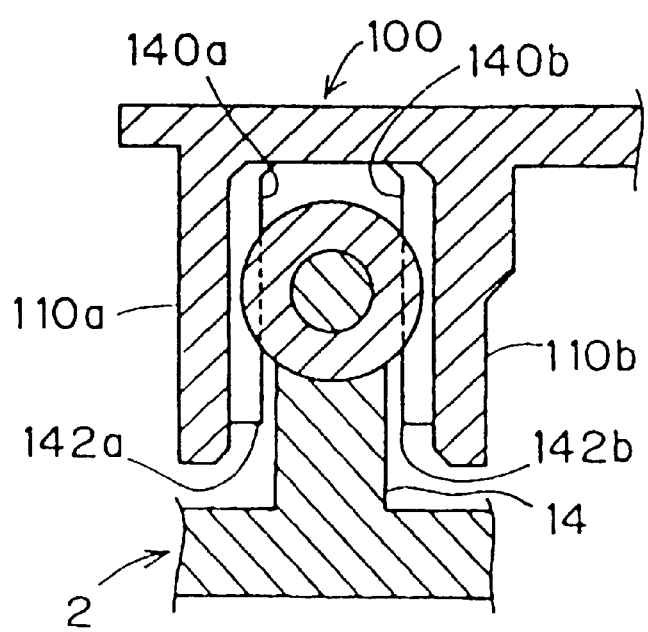
FIG. 4 is a cross-section of the optical connector of FIG. 1 after assembly.

As shown in FIGS. 1, 3 and 4, the inner faces of the guide plates 110a and 110b have a pair of stoppers 140a and 140b which face each other. Each stopper 140a and 140b has an elongated shape with a rectangular cross-section with a sharp rectangular edge 142a and 142b extending in a direction perpendicular to the axis of the fiber optic cable A. This edge acts as a cutting blade. The distance between stoppers 140a and 140b is slightly less than the diameter of the cable A, but greater than the diameter of the optical fibers c.

Figure 5:
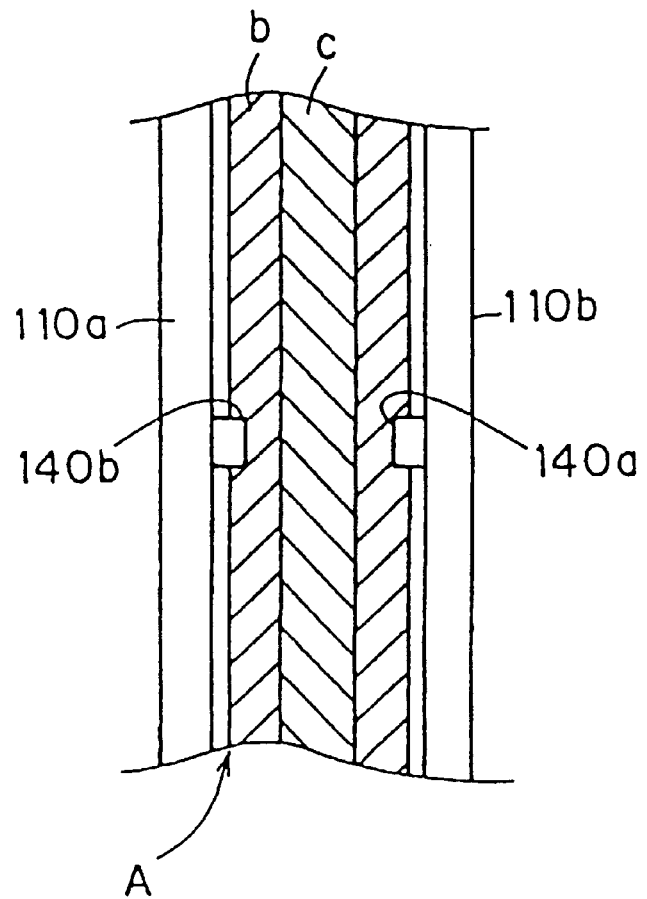
FIG. 5 is a top plan view of a longitudinal cross-section of the optical connector when it holds a fiber optic cable.

FIGS. 3–5 show the procedure to place the fiber optic cables into the connector.

As shown in FIG. 3, the fiber optic cable is inserted into a predetermined position inside the housing 2 and placed on the cable guide 14. The cover 100 is then pushed onto the housing 2 towards its housing space.

As cover 100 moves into place, the sharp edges 142a and 142b contact an upper circular surface of the coating b of cable A in a skewed position. With further pressure, edges 142a and 142b cut into the coating b, similar to a flat chisel. Edges 142a and 142b continue their downward movement until locking tabs 130 mate with locking recesses 24 and the cover 100 is securely mounted on the housing 2.

As shown in FIGS. 4 and 5, the stoppers 140a and 140b settle inside the sections of the coating b cut away by the sharp edges 142a and 142b. The stoppers thus hold the fiber optic cable A by maintaining it therebetween.

In this optical connector, the optical fibers c are not compressed, either during the press fitting of the cover 100, or in their maintained position where the fibers are sandwiched between the two stoppers 140a and 140b. As the stoppers 140a and 140b do not exert undesirable thrusting force towards the optical fibers c, the latter only minimally deforms, with a corresponding minimal optical loss.

In this construction, when the cover 100 is fitted onto the housing 2, the fiber optic cable A is fixedly held at the same time by the same operation. Mounting of the optical connector is therefore simple.

Further, the curved channel on cable guides 14 maintains cable A in a precise longitudinal position without sideways drift. Accordingly, cable A can be precisely positioned between the guide plates 110*a* and 110*b*.

Yet further, when the cover 100 is placed on the housing 2, a certain degree of force is required. To minimize this force, the width of the stoppers 140*a* and 140*b* is preferably less than 2 mm, and particularly less than 1 mm. This reduces the resistance to the sharp edges 142*a* and 142*b* when coating b is cut.

Figure 6:
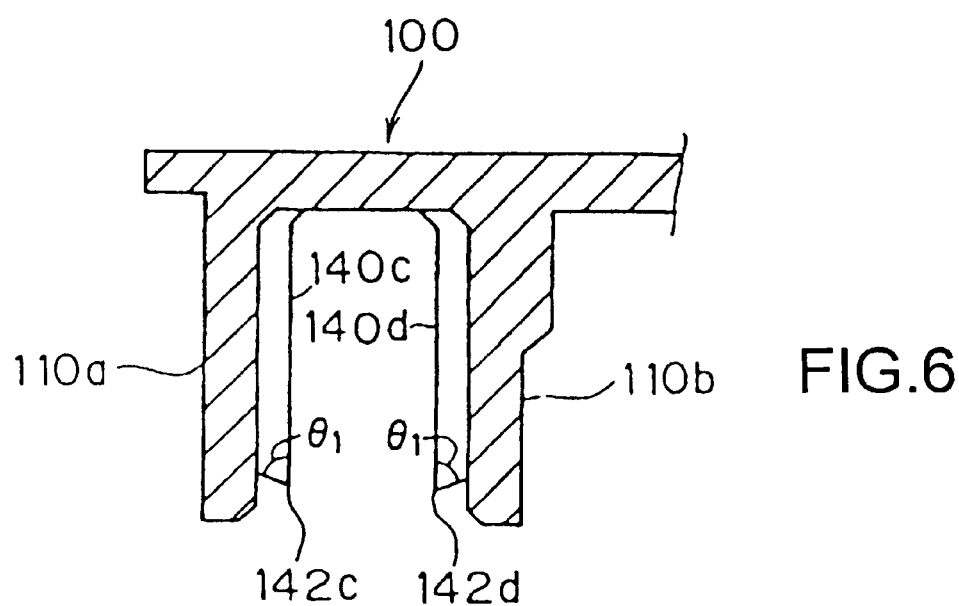
FIG. 6 is a side cross-sectional view of a pair of guide plates with a respective stopper of the optical connector according to a second embodiment.

Further, to ensure smooth cutting edges, edges 142*a* and 142*b* may have a slant angle $\theta_1$ of less than 100°. According to another embodiment of the present invention, shown in FIG. 6, the slant angle $\theta_1$ is preferably between 50° and 90°.

Figure 7:
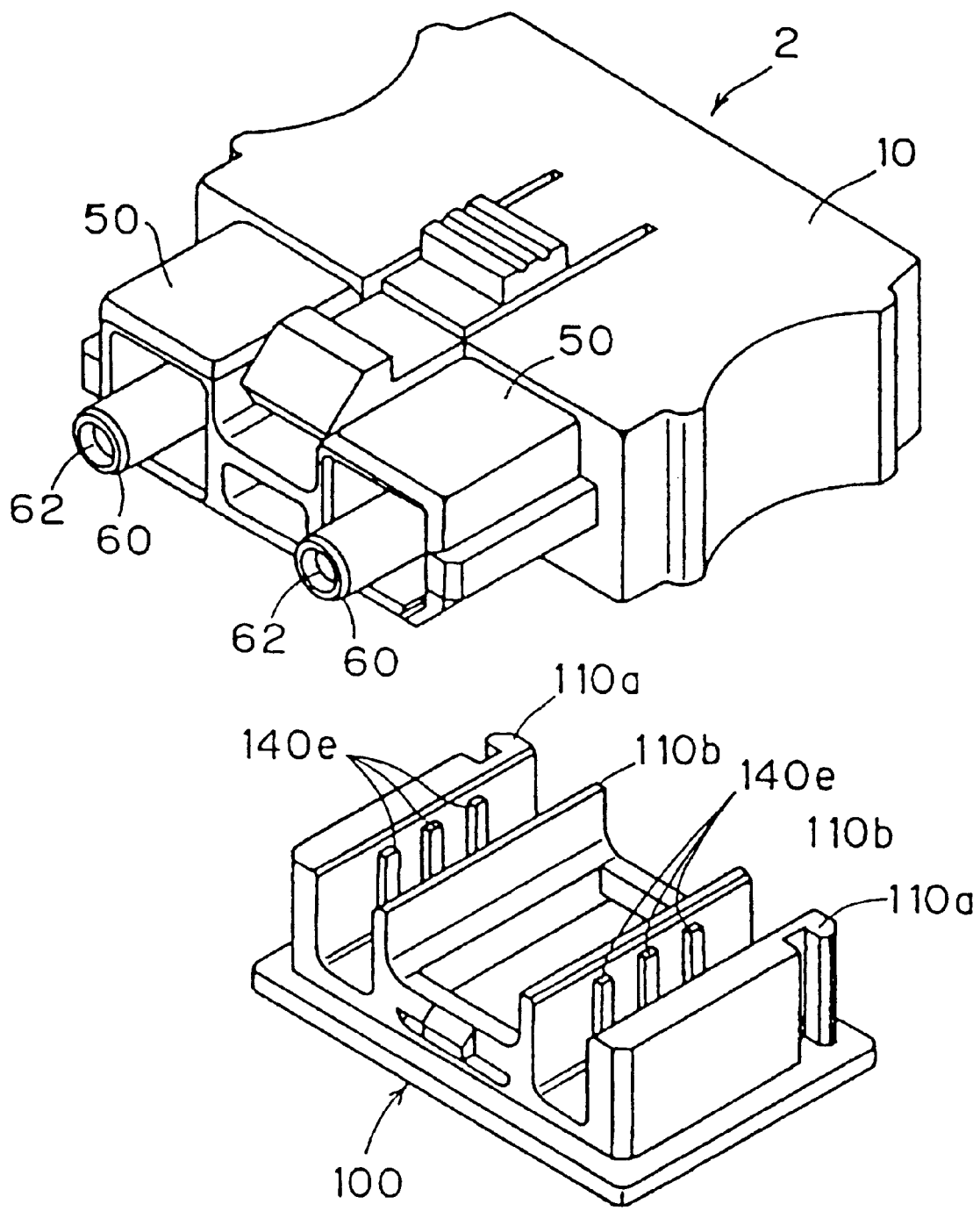
FIG. 7 is a perspective view of the optical connector according to a third embodiment, with a cover removed.
Figure 8:
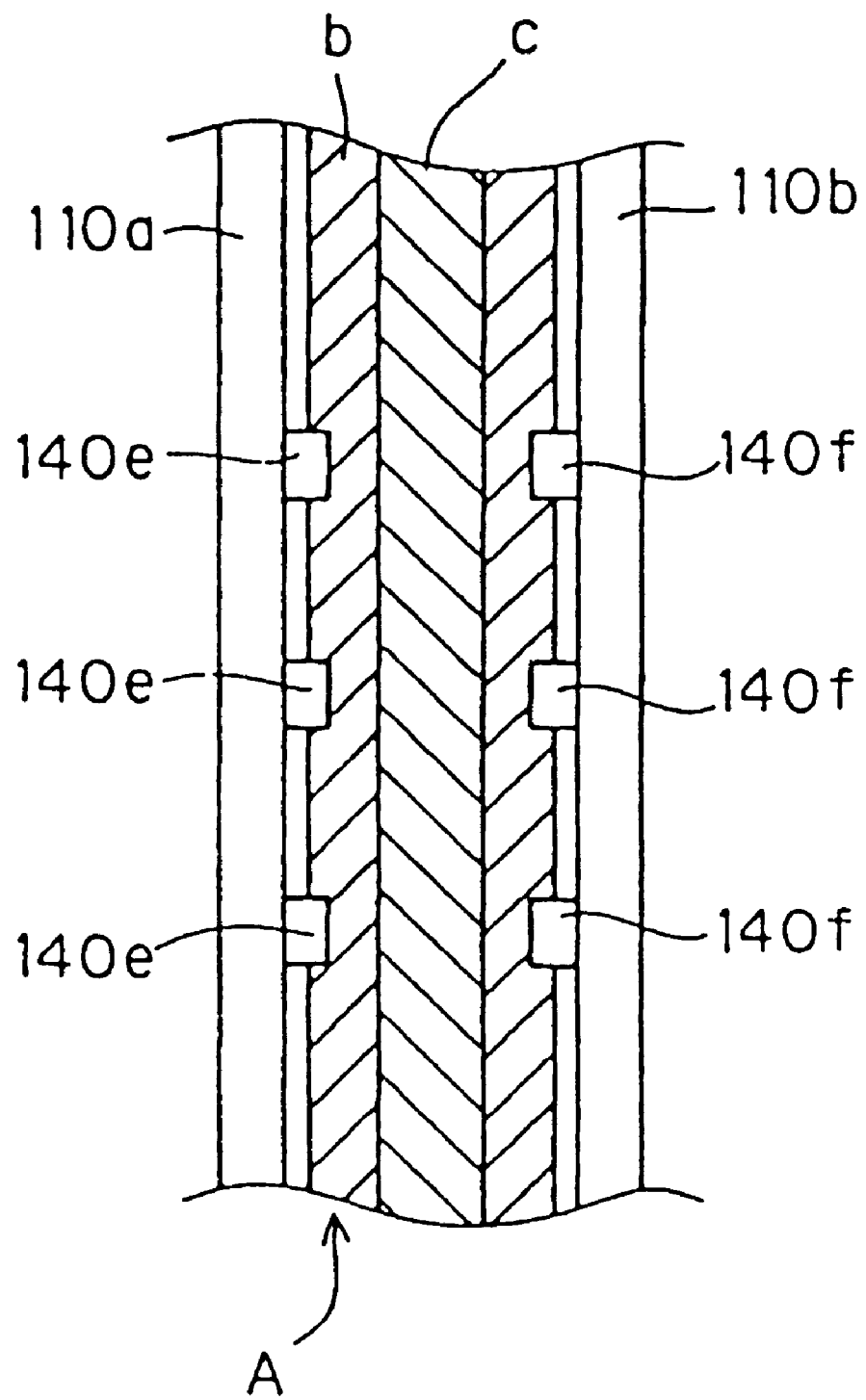
FIG. 8 is a longitudinal cross-section of the optical connector of FIG. 7.

According to another embodiment shown in FIGS. 7 and 8, several pairs of stoppers 140*e* and 140*f* are installed at a predetermined interval along the axis of the cable A. The cable is then retained more securely.

Figure 9:
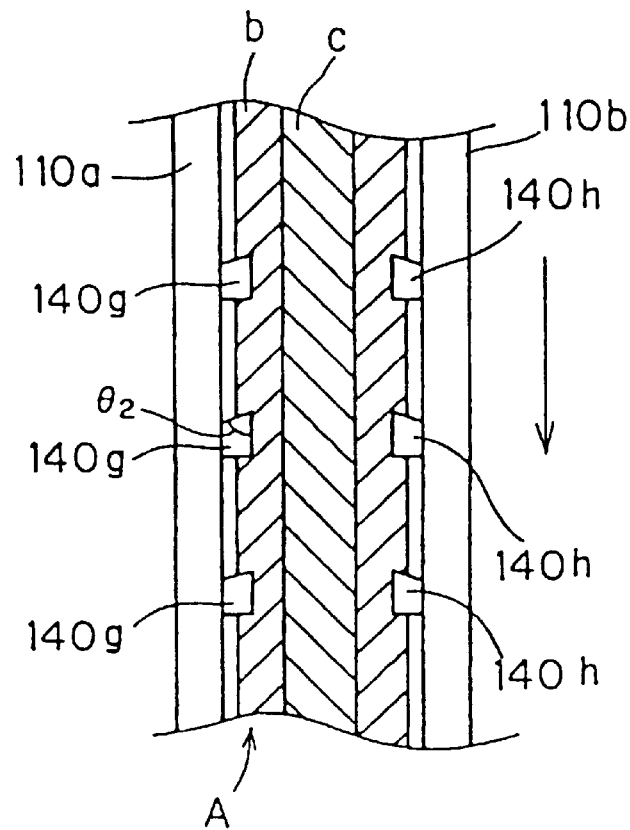
FIG. 9 is a longitudinal cross-section of an optical connector according to a fourth embodiment.

FIG. 9 shows another embodiment in which the front face (facing ferrule 60) of each of stoppers 140*g* and 140*h* tapers towards the front side (towards ferrule 60) of the casing portion 10 and/or towards the cable A. Each stopper may have a width of 0.8 mm, a taper angle $\theta_2$ of 90° for the front face (i.e., the angle of the front face with respect to the axis of the cable A) and a slant angle $\theta_1$ of 90° for the sharp edge. When the cable A is held under the above conditions, the cable shows a tensile strength above 60 N and an optical loss less than 0.1 dB.

Figure 10:
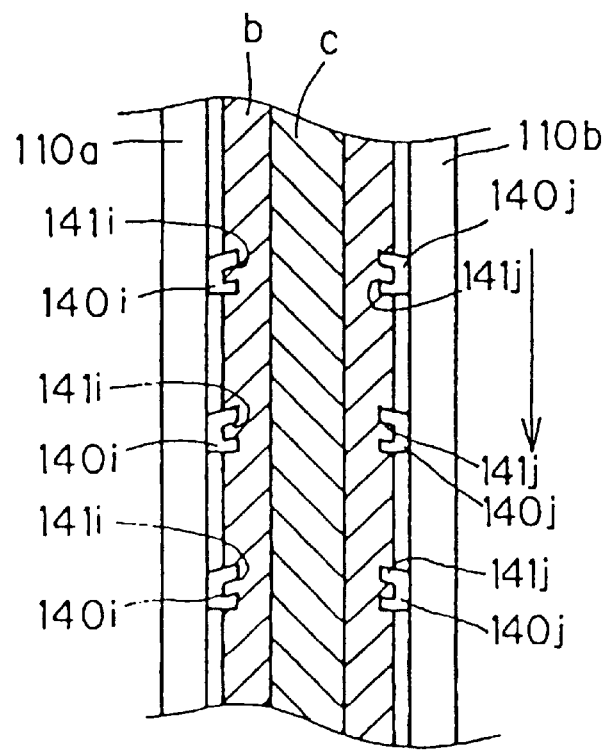
FIG. 10 is a longitudinal cross-section of the optical connector according to a fifth embodiment.

FIG. 10 shows a further embodiment in which the innermost opposing face of each of stoppers 140*i* and 140*j* are provided with concavities 141*i* and 141*j* in a perpendicular direction to the general plane of the cover 100. Likewise, the front face (facing the ferrule 60) of stoppers 140*i* and 140*j* may taper towards the front side (towards the ferrule 60) of the casing portion 10 and/or towards the cable.

In this embodiment, if a backward force (towards the openings 12) is applied to the cable A, stoppers 140*g*, 140*h*, 140*i*, and 140*j* retain cable A more forcefully.

While the invention has been described with reference to several exemplary embodiments, it is understood that the words which have been used herein are words of description and illustration, rather than words of limitations. Changes may be made, within the purview of the pending claims, as without effecting the scope and spirit of the invention and its aspects. While the invention has been described here with reference to particular means, materials and embodiments, the invention is not intended to be limited to the particular disclosed herein; rather, the invention extends to all functionally equivalent structures, methods and uses, such at all within the scope of the appended claims.

By way of non-limiting example, any combination of stoppers (e.g., 140*a*, 140*b*, 140*g*, 140*h*, 140*i*, and 140*j*) may be used on the guide plates. Further, any number of stoppers may be used. For example, a pair of stoppers 140*g* and 140*j* could be used. In another alternative, an odd number of stoppers could be used to form a zigzag or "z" pattern.

In another example, although the preferred embodiments are directed to holders for two cables, connectors for one cable or more than two cables could be used, and fall within the scope of the present invention.

In yet another example, although various structures are disclosed as part of housing 2 or cover 100, many of these elements (e.g., the stoppers 104, channel 14, guide plates 110, etc.) may be reversed; and such falls within the scope of the present invention.

The present invention relates to priority Japanese Patent Application No. 9-036046, filed Feb. 20, 1997, the disclosure of which is expressly incorporated by reference herein in its entirety.

What is claimed:

1. An optical connector which supports at least one fiber optic cable, said cable comprising a fiber optic core and a surrounding coating, said connector comprising:

a housing having a longitudinal direction, along which said at least one cable is arranged, and an elevational direction;

a cover;

at least one cable guide which supports each of said at least one fiber optic cable, said at least one cable guide being provided on one of said housing and said cover, and extending along said longitudinal direction;

at least one pair of guide plates provided on the other of said housing and said cover, said at least one pair of guide plates extending along said longitudinal and elevational directions and forming parallel opposing faces to flank said at least one fiber optic cable when said housing and said cover are connected; and at least one stopper provided on each of said parallel opposing faces of each of said at least one pair of guide plates along said elevational direction, said at least one stopper having an end which forms a cutting edge, whereby when said housing and said cover are being connected, said cutting edge cuts away part of said coating of said at least one fiber optic cable such that said at least one stopper securely holds said at least one fiber optic cable.

2. The optical connector according to claim 1, wherein said cutting edge has an angle of 50 to 90° with respect to said coating.

3. The optical connector according to claim 1, wherein said at least one stopper on each of said at least one pair of guide plates forms a plurality of pairs of stoppers facing each other at both sides of said at least one fiber optic cable, and each pair is provided along said longitudinal direction at a predetermined pitch.

4. The optical connector according to claim 2, wherein said at least one stopper on each of said at least one pair of guide plates forms a plurality of pairs of stoppers facing each other at both sides of said at least one fiber optic cable and each pair is provided along said longitudinal direction at a predetermined pitch.

5. The optical connector according to claim 1, wherein said cutting edge of said at least one stopper has a length of not more than 1 mm along said longitudinal direction.

6. The optical connector according to claim 2, wherein said cutting edge of said at least one stopper has a length of not more than 1 mm along said longitudinal direction.

7. The optical connector according to claim 3, wherein said cutting edge of said at least one stopper has a length of not more than 1 mm along said longitudinal direction.

8. The optical connector according to claim 4, wherein said cutting edge of said at least one stopper has a length of not more than 1 mm along said longitudinal direction.

9. The optical connector according to claim 1, wherein said at least one stopper includes a first stopper having a substantially rectangular cross-section and an innermost face extending along said elevational direction, said face having a groove along said elevational direction.

10. The optical connector according to claim 1, wherein said housing has a front side and a rear side at each end of said longitudinal direction, said front side including at least one ferrule, and said rear side including at least one opening respectively, which can receive said at least one fiber optic cable.

11. The optical connector according to claim 10, wherein said at least one stopper includes a stopper having a substantially rectangular cross-section and a face facing said front sides, said face tapering towards said front side as it extends from said guide plate.

12. The optical connector according to claim 9, wherein said first stopper further has a face facing said front side, said face tapering towards said front side as it extends from said guide plate.

13. The optical connector according to claim 1, wherein said cable guide comprises a channel along said longitudinal direction.

14. The optical connector according to claim 2, wherein said cable guide comprises a channel along said longitudinal direction.

15. The optical connector according to claim 3, wherein said cable guide comprises a channel along said longitudinal direction.

16. The optical connector according to claim 4, wherein said cable guide comprises a channel along said longitudinal direction.

17. The optical connector according to claim 5, wherein said cable guide comprises a channel along said longitudinal direction.

18. The optical connector according to claim 6, wherein said cable guide comprises a channel along said longitudinal direction.

19. The optical connector according to claim 7, wherein said cable guide comprises a channel along said longitudinal direction.

20. The optical connector according to claim 8, wherein said cable guide comprises a channel along said longitudinal direction.

* * * * *